United States Patent
Tanaka

(10) Patent No.: US 8,718,138 B2
(45) Date of Patent: May 6, 2014

(54) IMAGE ENCODING APPARATUS AND IMAGE ENCODING METHOD THAT DETERMINE AN ENCODING METHOD, TO BE USED FOR A BLOCK TO BE ENCODED, ON THE BASIS OF AN INTRA-FRAME-PREDICTION EVALUATION VALUE CALCULATED USING PREDICTION ERRORS BETWEEN SELECTED REFERENCE PIXELS AND AN INPUT IMAGE

(75) Inventor: Eiichi Tanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1131 days.

(21) Appl. No.: 12/116,900

(22) Filed: May 7, 2008

(65) Prior Publication Data

US 2009/0034617 A1    Feb. 5, 2009

(30) Foreign Application Priority Data

May 8, 2007   (JP) ................... 2007-123806

(51) Int. Cl.
| | |
|---|---|
| H04B 1/66 | (2006.01) |
| H04N 7/12 | (2006.01) |
| H04N 11/02 | (2006.01) |
| H04N 11/04 | (2006.01) |
| H04N 7/26 | (2006.01) |

(52) U.S. Cl.
CPC ..... *H04N 19/00018* (2013.01); *H04N 7/26021* (2013.01)
USPC .............. 375/240.13; 375/240.08; 375/240.1; 375/240.12; 375/240.24

(58) Field of Classification Search
None
See application file for complete search history.

(56) References Cited

U.S. PATENT DOCUMENTS

| | | | | | |
|---|---|---|---|---|---|
| 5,260,783 | A | * | 11/1993 | Dixit ........................ | 375/240.13 |
| 5,537,147 | A | * | 7/1996 | Tahara ...................... | 348/400.1 |
| 5,657,086 | A | * | 8/1997 | Tahara et al. ............ | 375/240.13 |
| 5,717,462 | A | * | 2/1998 | Hayashi ................... | 375/240.13 |
| 5,963,673 | A | * | 10/1999 | Kodama et al. ............. | 382/239 |
| 6,259,736 | B1 | * | 7/2001 | Chujoh et al. ........... | 375/240.13 |
| 6,625,215 | B1 | * | 9/2003 | Faryar et al. ............. | 375/240.14 |
| 6,681,049 | B1 | * | 1/2004 | Kobayashi et al. .......... | 382/237 |
| 7,957,466 | B2 | * | 6/2011 | Paniconi et al. ......... | 375/240.16 |
| 2002/0172283 | A1 | * | 11/2002 | Kawakatsu et al. ...... | 375/240.13 |
| 2004/0233989 | A1 | * | 11/2004 | Kobayashi et al. ...... | 375/240.16 |
| 2005/0105618 | A1 | * | 5/2005 | Booth et al. ............. | 375/240.16 |

(Continued)

FOREIGN PATENT DOCUMENTS

| | | |
|---|---|---|
| JP | 2005-244749 A | 9/2005 |
| JP | 2006-304102 A | 11/2006 |
| WO | WO 2006126694 A2 * | 11/2006 |

OTHER PUBLICATIONS

Tu-Chih Wang et al., Performance analysis of hardware oriented algorithm modifications in H.264, IEEE International Conference on Acoustics, Speech, and Signal Processing (ICASSP 2003), Apr. 2003, vol. 2, p. 493-496.

*Primary Examiner* — Ayaz Sheikh
*Assistant Examiner* — Peter Chau
(74) *Attorney, Agent, or Firm* — Canon U.S.A., Inc. IP Division

(57) ABSTRACT

In an image encoding apparatus including an intra-frame prediction unit that executes intra-frame prediction regarding an input image, when locally decoded pixels are not available, pseudo reference pixels are set to calculate an intra-frame-prediction evaluation value, and a method of encoding to be used for a block to be encoded is determined on the basis of the intra-frame-prediction evaluation value.

11 Claims, 8 Drawing Sheets

(56) References Cited

U.S. PATENT DOCUMENTS

| | | |
|---|---|---|
| 2006/0008038 A1* | 1/2006 | Song et al. .................... 375/350 |
| 2006/0176956 A1* | 8/2006 | Ducloux et al. ......... 375/240.13 |
| 2006/0176962 A1* | 8/2006 | Arimura et al. .......... 375/240.24 |
| 2006/0239349 A1 | 10/2006 | Shibayama |
| 2007/0002948 A1* | 1/2007 | Shibahara et al. ....... 375/240.12 |
| 2007/0009044 A1* | 1/2007 | Tourapis et al. ......... 375/240.25 |
| 2007/0047648 A1* | 3/2007 | Tourapis et al. ......... 375/240.13 |
| 2007/0086523 A1* | 4/2007 | Yan .......................... 375/240.13 |
| 2007/0157070 A1* | 7/2007 | Wenger et al. ................. 714/807 |
| 2007/0248271 A1* | 10/2007 | Sakai et al. .................... 382/236 |
| 2008/0043843 A1* | 2/2008 | Nakaishi .................. 375/240.16 |
| 2008/0112481 A1* | 5/2008 | Hsaing et al. ............. 375/240.03 |
| 2008/0247469 A1* | 10/2008 | Vadapalli et al. ........ 375/240.27 |

* cited by examiner

IMAGE ENCODING APPARATUS AND IMAGE ENCODING METHOD THAT DETERMINE AN ENCODING METHOD, TO BE USED FOR A BLOCK TO BE ENCODED, ON THE BASIS OF AN INTRA-FRAME-PREDICTION EVALUATION VALUE CALCULATED USING PREDICTION ERRORS BETWEEN SELECTED REFERENCE PIXELS AND AN INPUT IMAGE

BACKGROUND OF THE INVENTION

1. Field of the Invention

The present invention relates to image encoding apparatuses, image encoding methods, programs, and recording media. More specifically, the present invention relates to prediction encoding apparatuses.

2. Description of the Related Art

MPEG4 and H.264 are known as standards for compression encoding of macro blocks of moving-picture data using inter-frame and intra-frame correlations. In these standards, it is possible to achieve high-quality compression by using an inter-frame prediction method when temporal correlation between frames is high while using an intra-frame prediction method when correlation within a frame is high. Particularly, in the H.264 standard, a plurality of prediction units or a plurality of prediction modes is prepared for each of inter-frame prediction and intra-frame prediction so that methods of compression encoding are enhanced compared with those in MPEG4.

The inter-frame prediction is effective in cases where motion of objects is relatively small. In the inter-frame prediction, an image having a high correlation with a current macro block is extracted from a temporally preceding or succeeding frame, and a difference between the image and the macro block is encoded. At that time, a motion vector indicating which portion has been extracted is also encoded.

In contrast, the intra-frame prediction is effective when correlation within a frame is high. In the intra-frame prediction, prediction errors are calculated on the basis of correlation between a current macro block and an adjacent macro block, or correlation within a macro block. Thus, even in cases where motion of objects is relatively large, making it difficult to determine an optimal motion vector by inter-frame prediction, it may be possible to achieve relatively efficient encoding using intra-frame prediction.

In a case where these two types of prediction can be used, it is necessary to determine which types of prediction will be efficient to achieve high-quality compression. When there exists no particular restriction on processing time (e.g., in a case of compressing uncompressed moving-picture data that has already been recorded), it is possible to execute encoding using each of all the possible methods, units, and modes and then select an optimal method according to the results. However, for example, when encoding is to be executed in real time while shooting a moving picture using a video camera, the above method is so complex and resource intensive that it is difficult to use the method. Therefore, it is necessary to select either inter-frame encoding or intra-frame encoding on the basis of an evaluation value.

As an example of related art for this purpose, according to Japanese Patent Laid-Open No. 2005-244749, an evaluation value for intra-frame-prediction encoding is calculated on the basis of input pixels alone before actually executing intra-frame-prediction encoding, and the evaluation value is used to select an encoding method. According to the related art, since an evaluation value representing a feature of inter-frame-prediction encoding is calculated using input pixels alone, processing for selection of an encoding method can be simplified significantly, and it is possible to considerably reduce processing time needed for the selection.

In a moving-picture encoding apparatus described in Japanese Patent Laid-Open No. 2005-244749, an evaluation value regarding intra-frame prediction, representing correlation between input pixels, is calculated, thereby estimating prediction errors that occur through intra-frame prediction before actually executing encoding. In the case of H.264, however, pixels that are used to calculate predicted values for inter-frame-prediction encoding are not input pixels. In H.264, the pixels actually used to calculate predicted values are pixels obtained by executing an integer transform and quantization on prediction errors and then executing a dequantization and inverse transform on the results (hereinafter referred to as locally decoded pixels). Therefore, if the techniques described in Japanese Patent Laid-Open No. 2005-244749 are used in H.264 encoding, problems arise because pixels are used that are different from the pixels that more favorably should be used. This can result in an inappropriate decision regarding whether to use inter-frame prediction or intra-frame prediction. An inaccurate decision regarding whether inter-frame prediction or intra-frame prediction should be used can reduce the quality of the compression encoding. Furthermore, there exists a similar problem regarding selection between a plurality of prediction methods of intra-frame prediction encoding.

In the case of compression at a low compression rate, where compression encoding typically causes little distortion, differences between input pixels and locally decoded pixels are small. Thus, even if inter-frame or intra-frame prediction is selected using input pixels instead of locally decoded pixels, the accuracy of selection is not considerably degraded. In contrast, in the case of compression at a high compression rate, where compression encoding typically causes much distortion, locally decoded pixels are considerably distorted relative to input pixels. Therefore, where the determination regarding whether to use inter-frame prediction or intra-frame prediction is based on locally decoded pixels it has been difficult to generate optimal prediction errors.

SUMMARY OF THE INVENTION

The present invention makes it possible to select a method of predictive encoding accurately and to achieve efficient compression encoding.

According to an aspect of the present invention, an image encoding apparatus includes an intra-frame prediction unit configured to execute intra-frame prediction regarding an input image, individually for blocks having an arbitrary size, thereby generating intra-frame prediction errors, and configured to decode the intra-frame prediction errors to generate intra-frame-prediction reference pixels; a pseudo-reference-pixel setting unit configured to set pseudo reference pixels from the input image; a pixel selecting unit configured to select, as reference pixels, one of the intra-frame-prediction reference pixels and the pseudo reference pixels; an intra-frame-prediction evaluation-value calculating unit configured to calculate an intra-frame-prediction evaluation value using prediction errors between the reference pixels selected by the pixel selecting unit and the input image; and a determining unit configured to determine an encoding method, to be used for a block to be encoded, on the basis of the intra-frame-prediction evaluation value.

According to another aspect of the present invention, an image encoding apparatus includes an intra-frame prediction unit configured to execute intra-frame prediction regarding a plurality of frames of an input image, individually for blocks having an arbitrary size, thereby generating intra-frame prediction errors for respective frames, and to decode the intra-frame prediction errors to generate intra-frame-prediction reference pixels for respective frames; a pseudo-reference-pixel setting unit configured to set, as pseudo reference pixels for a current frame, intra-frame-prediction reference pixels corresponding to another frame and located at corresponding positions in a macro block; a pixel selecting unit configured to select, as reference pixels for the current frame, one of the intra-frame-prediction reference pixels of the current frame and the pseudo reference pixels of the current frame; an intra-frame-prediction evaluation-value calculating unit configured to calculate an intra-frame-prediction evaluation value for the current frame using prediction errors between the reference pixels for the current frame selected by the pixel selecting unit and the input image; and a determining unit configured to determine an encoding method, to be used for a block to be encoded, on the basis of the intra-frame-prediction evaluation value for the current frame.

According to the present invention, a pseudo-reference-pixel setting unit is provided to set pseudo reference pixels for an input image, and either the pseudo reference pixels or locally decoded intra-frame-prediction reference pixels are selected as reference pixels. Furthermore, an intra-frame-prediction evaluation value is calculated using prediction errors between the selected reference pixels and the input image. Accordingly, it is possible to determine accurately whether to use inter-frame prediction or intra-frame prediction as an encoding method to be used for a block to be encoded. High-quality compression can be achieved efficiently even if the compression rate is high. Furthermore, by calculating evaluation values individually for a plurality of intra-frame prediction methods, similar advantages can be achieved in a case where an optimal prediction method is selected from a plurality of prediction methods.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present invention, and, together with the description, serve to explain the principles of the present invention.

DESCRIPTION OF THE EMBODIMENTS

Figure 1:
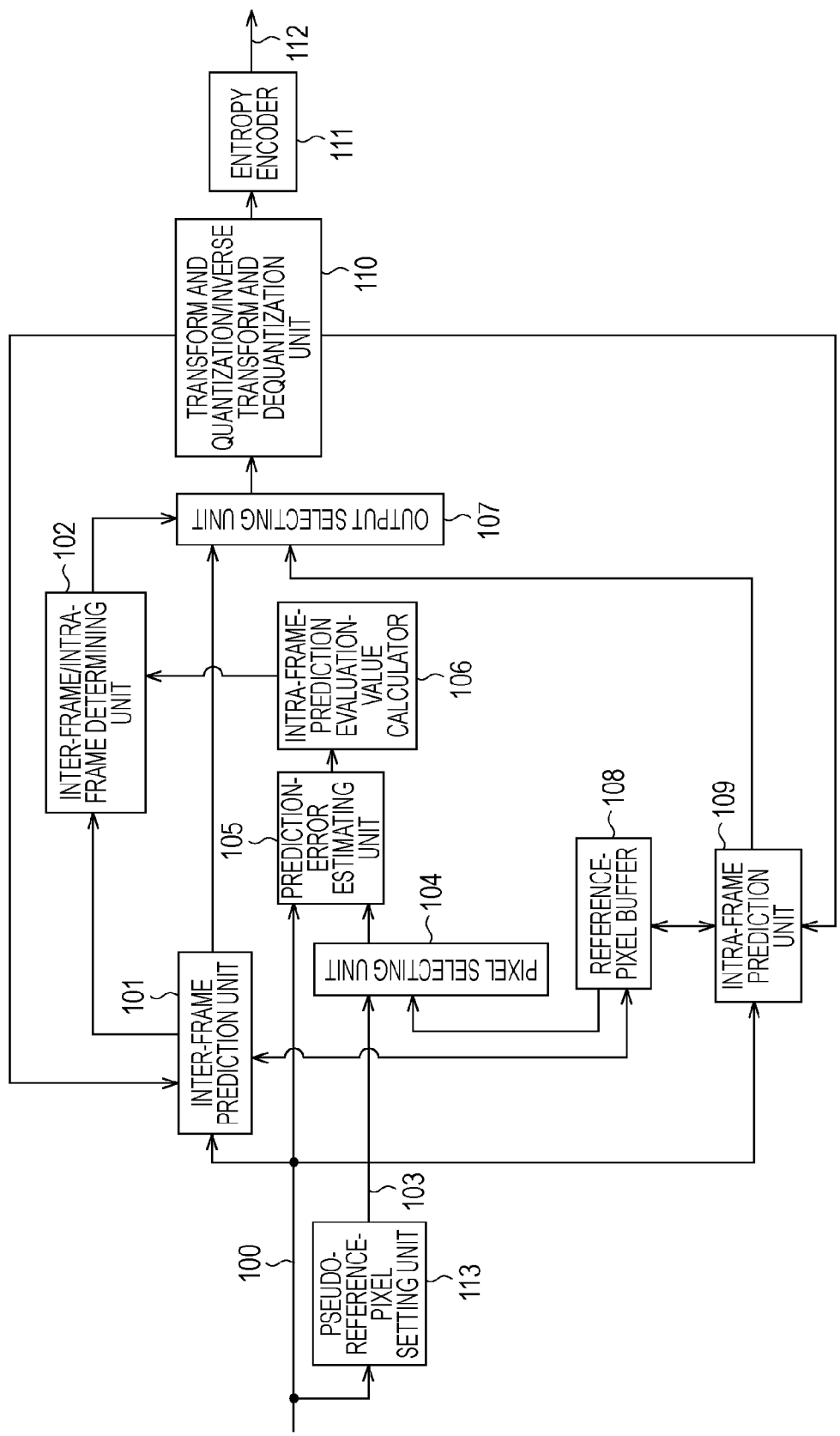
FIG. 1 is a block diagram showing an example of a functional configuration of an image encoding apparatus according to a first embodiment of the present invention.

Embodiments of the present invention are described in detail below with reference to the accompanying drawings.
First Embodiment FIG. 1 is a block diagram showing an example functional configuration of an image encoding apparatus according to a first embodiment of the present invention. The first embodiment is described in the context of an example where image data yet to be encoded, representing an input image, is encoded according to the H.264 standard.

An inter-frame prediction unit 101 executes an inter-frame prediction operation regarding an input image 100 to output inter-frame prediction errors. An inter-frame/intra-frame determining unit 102 determines whether inter-frame prediction or intra-frame prediction is to be used for processing of a next macro block.

A pseudo-reference-pixel setting unit 113 sets arbitrary pseudo-reference-pixel signals 103 as values of pseudo reference pixels. For example, the pseudo-reference-pixel signals 103 may be signals representing a predetermined image or an image obtained by executing interpolation on the input image 100 or filtering the input image 100. A pixel selecting unit 104 selects data, to be output, on the basis of the status of reference pixels after local decoding. On the basis of the difference between the input image 100 and the data output from the pixel selecting unit 104, a prediction-error estimating unit 105 estimates prediction errors that will occur by intra-frame prediction. If a plurality of intra-frame prediction methods is available, prediction errors are estimated for each of the intra-frame prediction methods. An intra-frame-prediction evaluation-value calculator 106 calculates an evaluation value for intra-frame prediction on the basis of the prediction errors estimated by the prediction-error estimating unit 105. If a plurality of intra-frame prediction methods is available, an evaluation value is calculated for each of the intra-frame prediction methods.

An output selecting unit 107 selects data, to be output, on the basis of the result of determination by the inter-frame/intra-frame determining unit 102. A reference-pixel buffer 108 stores reference pixels. An intra-frame prediction unit 109 executes an intra-frame prediction operation regarding the input image 100 to output prediction errors. A transform and quantization/inverse transform and dequantization unit 110 executes integer transform and quantization on input data to output quantized data. The transform and quantization/inverse transform and dequantization unit 110 also executes dequantization and inverse transform to output locally decoded pixels. An entropy encoder 111 encodes data to output an encoded stream 112.

Figure 10:
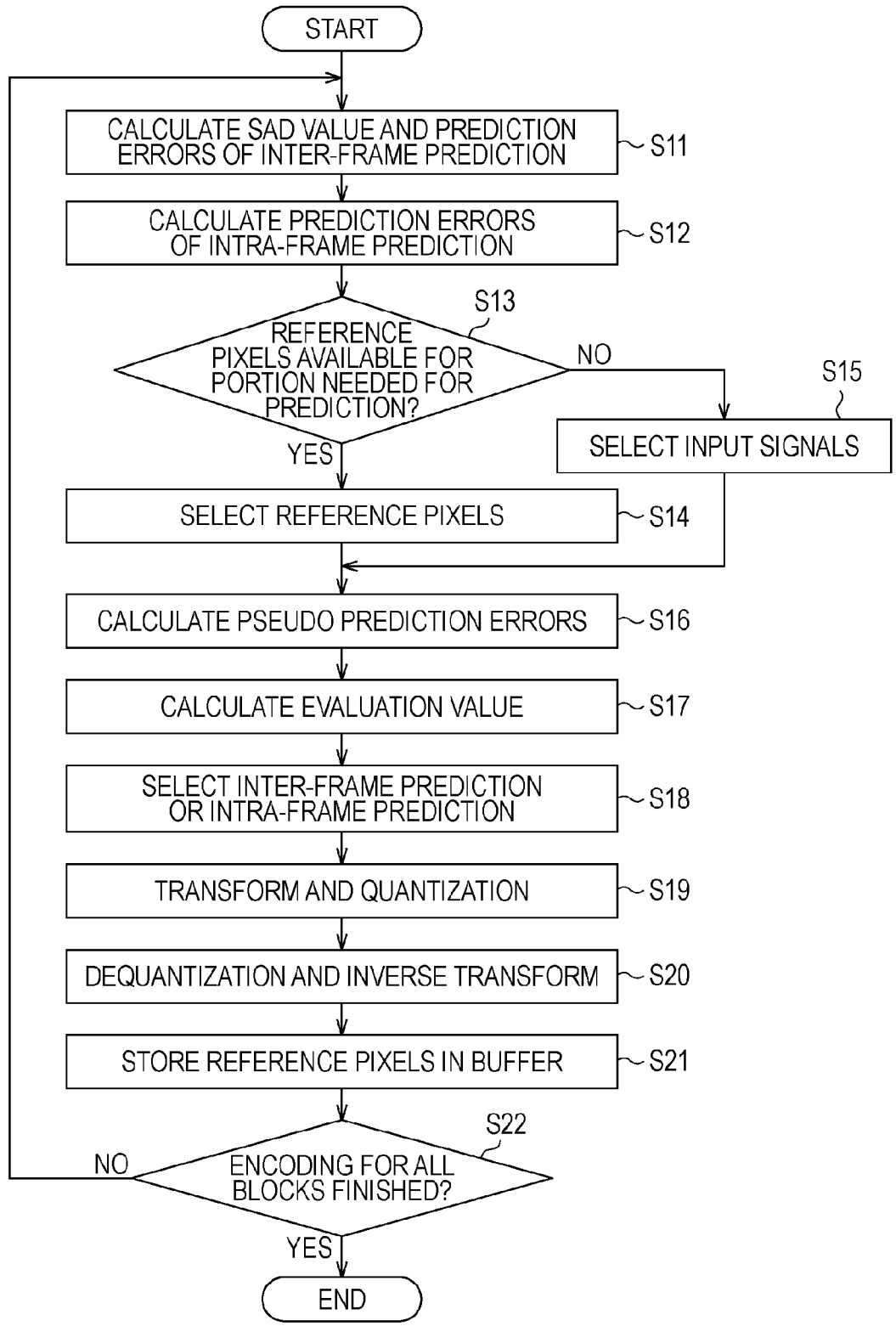
FIG. 10 is a flowchart showing an example of a procedure of processing executed by the image encoding apparatus according to the first embodiment.

Next, the operation of the image encoding apparatus according to this embodiment is described with reference to FIGS. 1 and 10. First, the input image 100 is input to the inter-frame prediction unit 101, the prediction-error estimating unit 105, and the intra-frame prediction unit 109.

In step S11, the inter-frame prediction unit 101 calculates prediction errors and a sum of absolute differences of the prediction errors (hereinafter referred to as an SAD value) using macro blocks in the frames temporally preceding and succeeding the input image 100 as predictive values.

In order to use a temporally succeeding frame, it is necessary that encoding of the succeeding frame has already been finished. It becomes readily possible to use a temporally succeeding frame by changing the order of input of frames of the input image 100.

Then, in step S12, in the case of the H.264 standard, the intra-frame prediction unit 109 uses locally decoded pixels as reference pixels. Then, the intra-frame prediction unit 109 calculates prediction errors between input pixels at the reference pixels within a frame. The locally decoded pixels used as the reference pixels are pixels that have already been encoded and that are adjacent to the macro block currently being encoded. Steps S11 and S12 may be executed in the reverse order. Steps S11 and S12 may alternatively be executed simultaneously.

Then, in step S13, the pixel selecting unit 104 determines whether reference pixels of a portion needed to calculate predictive values are temporally available. If it is determined in step S13 that the reference pixels of the portion needed to calculate predictive values are temporally available, (YES in S13), the pixel selecting unit 104 selects the reference pixels and outputs the reference pixels to the prediction-error estimating unit 105 in step S14, and processing then continues at step S16. On the other hand, if it is determined in step S13 that the reference pixels are not temporally available, in step S15, the pixel selecting unit 104 selects pseudo-reference-pixel signals 103 and outputs them to the prediction-error estimating unit 105. The criteria for selection will be described later. Processing then continues at step S16.

Then, in step S16, the prediction-error estimating unit 105 calculates prediction errors (estimated intra-frame prediction errors) relative to the input image 100, using data output from the pixel selecting unit 104. The method of calculating prediction errors is the same as that used in the intra-frame prediction unit 109 (in units of 16×16 pixels in the case of H.264). However, since data output from the pixel selecting unit 104 is not necessarily reference pixels obtained through local decoding, data output from the prediction-error estimating unit 105 represents pseudo prediction errors rather than accurate prediction errors.

Then, in step S17, the intra-frame-prediction evaluation-value calculator 106 calculates an intra-frame-prediction evaluation value for a case where intra-frame encoding is executed, using the pseudo prediction errors output from the prediction-error estimating unit 105 (estimated intra-frame-prediction errors).

Then, in step S18, the inter-frame/intra-frame determining unit 102 determines whether to use inter-frame prediction or intra-frame prediction for a next macro block, using the SAD value output from the inter-frame prediction unit 101, i.e., the inter-frame-prediction evaluation value, and the intra-frame-prediction evaluation value output from the intra-frame-prediction evaluation-value calculator 106. The calculation of an intra-frame-prediction evaluation value and the selection of inter-frame prediction or intra-frame prediction can be executed using known methods. For example, an SAD value of pseudo prediction errors is calculated as an intra-frame-prediction evaluation value, and the SAD value for intra-frame prediction and the SAD value for inter-frame prediction are compared with each other to determine whether intra-frame prediction or inter-frame prediction results in less error (i.e., which of these SAD values is smaller). According to the determination by the inter-frame/intra-frame determining unit 102, the output selecting unit 107 outputs either data output from the inter-frame prediction unit 101 or data output from the intra-frame prediction unit 109 to the transform and quantization/inverse transform and dequantization unit 110.

Then, in step S19, the transform and quantization/inverse transform and dequantization unit 110 executes transform and quantization on the input data, and outputs the resulting quantized data to the entropy encoder 111. Then, the entropy encoder 111 executes entropy encoding of the input quantized data, and outputs the result as an encoded stream 112.

Then, in step S20, the transform and quantization/inverse transform and dequantization unit 110 executes dequantization and inverse transform on the data obtained through transform and quantization, thereby generating locally decoded pixels (inter-frame-prediction reference pixels or intra-frame-prediction reference pixels). The decoded data is output to the reference-pixel buffer 108.

Then, in step S21, the decoded data is stored in the reference-pixel buffer 108. The decoded data must be stored since the data is used as reference pixels at the time of prediction.

Then, in step S22, it is determined whether encoding for all the blocks has been finished. If it is determined in step S22 that encoding for all the blocks has been finished, (YES in step S22), the process comes to an end. On the other hand, if it is determined in step S22 that encoding has not been finished, (NO in step S22), the process returns to step S11, and the same processing is executed for the next block to be encoded.

Since locally decoded pixels are used for intra-frame prediction as described earlier, it is difficult to obtain prediction errors for the next macro block only from the input image 100. In order to calculate prediction errors using locally decoded pixels and to accurately determine whether to use inter-frame prediction or intra-frame prediction, a function for transform and quantization/inverse transform and dequantization dedicated for intra-frame prediction is provided separately. This is because in order to start next processing without waiting for completion of local decoding, transform and quantization/inverse transform and dequantization for intra-frame prediction is executed separately in advance.

However, since a transform and quantization unit generally has a large circuit scale, it incurs considerable cost to use a plurality of transform and quantization units. Thus, in this embodiment, pseudo prediction errors are calculated using input pixels and reference pixels, and it is determined on the basis of the pseudo prediction errors whether to use inter-frame prediction or intra-frame prediction. Accordingly, without using a plurality of transform and quantization units, it is possible to determine accurately whether to use inter-frame prediction or intra-frame prediction. It is to be noted that the pseudo prediction errors are used to determine whether to use inter-frame prediction or intra-frame prediction, and locally decoded pixels are used for actual encoding instead of using the pseudo prediction errors.

Figure 4:
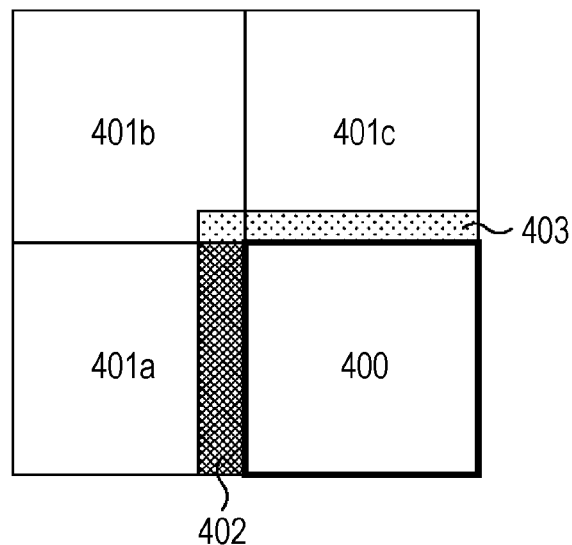
FIG. 4 is a diagram showing positional relationship among adjacent reference macro blocks and reference pixels in an input image.

Next, reference pixels that are temporally available and other reference pixels will be described with reference to FIGS. 4 and 5. In FIG. 4, 400 denotes a macro block currently being encoded, 401a to 401c denote macro blocks that are adjacent to the macro block 400 and for which encoding and local decoding have been finished or will soon be finished. 402 denotes left reference pixels adjacent to the macro block 400, and 403 denotes upper reference pixels adjacent to the macro block 400.

Figure 5:
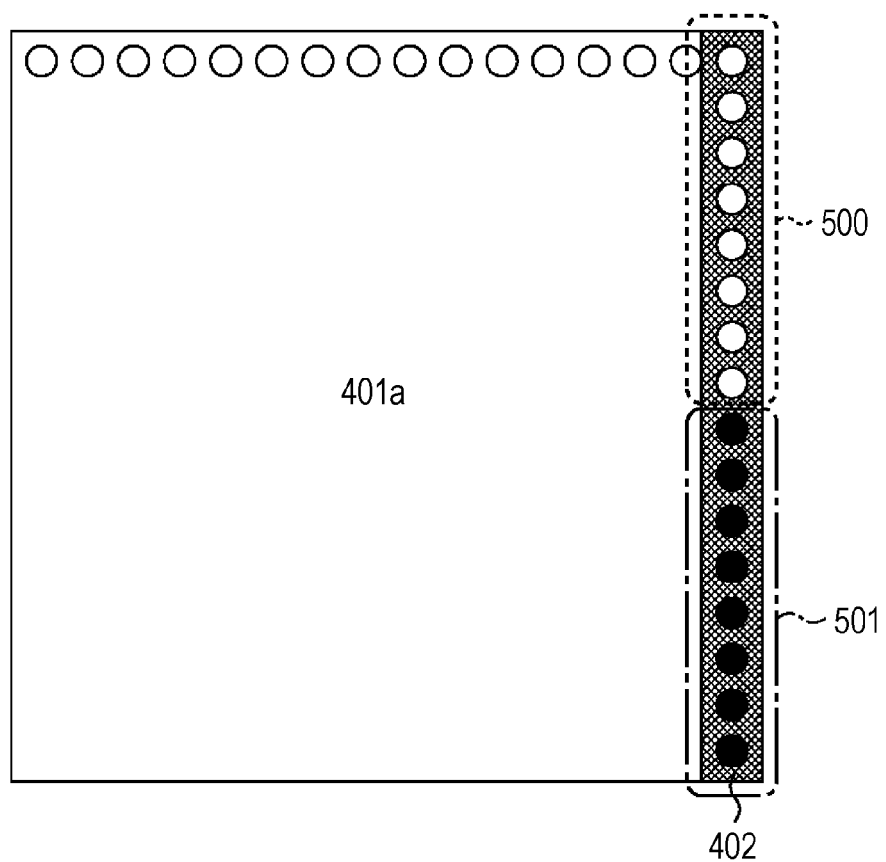
FIG. 5 is an enlarged view of a left reference macro block shown in FIG. 4.

FIG. 5 is an enlarged view of the left reference macro block 401*a* in FIG. 4. FIG. 5 illustrates left reference pixels 402, available reference pixels 500 (reference pixels for which encoding and local decoding have been finished), and pixels 501 for which encoding and local decoding have not been finished.

The upper reference pixels 403 shown in FIG. 4 exist on a line of the immediately upper macro block. Thus, when processing for the macro block 400 is executed, encoding and local decoding of the upper reference pixels 403 have already been finished. Thus the upper reference pixels 403 are available. However, the left reference pixels 402 are not necessarily available. For example, as shown in FIG. 5, there might be a situation where encoding and local decoding are going on so that encoding and local decoding have been finished for some pixels and not finished for the other pixels among the left reference pixels 402 in the same macro block.

In this case, in order to calculate pseudo prediction errors as accurately as possible regarding the macro block 400 currently being encoded, the pixel selecting unit 104 adaptively switches data that is output to the prediction-error estimating unit 105. More specifically, if reference pixels are temporally available, for example, in the case of the reference pixels 500, the pixel selecting unit 104 outputs the reference pixels 500 to the prediction-error estimating unit 105. As for the subsequent data, the pixel selecting unit 104 outputs pseudo-reference-pixel signals 103 instead of the pixels 501, for which encoding and local decoding have not been finished. The pseudo-reference-pixel signals 103 may be signals representing the input image 100 itself, or an image having a predetermined brightness, a predetermined color, a predetermined graphic pattern, or certain gradation, or a combination of these.

According to the operation described above, pixels that are not reference pixels obtained through local decoding are used only minimally. Furthermore, since the upper reference pixels 403 used in the prediction-error estimating unit 105 are the same as the reference pixels actually used by the intra-frame prediction unit 109, prediction errors can be calculated more accurately compared with a case where only input pixels are used.

Second Embodiment

Figure 2:
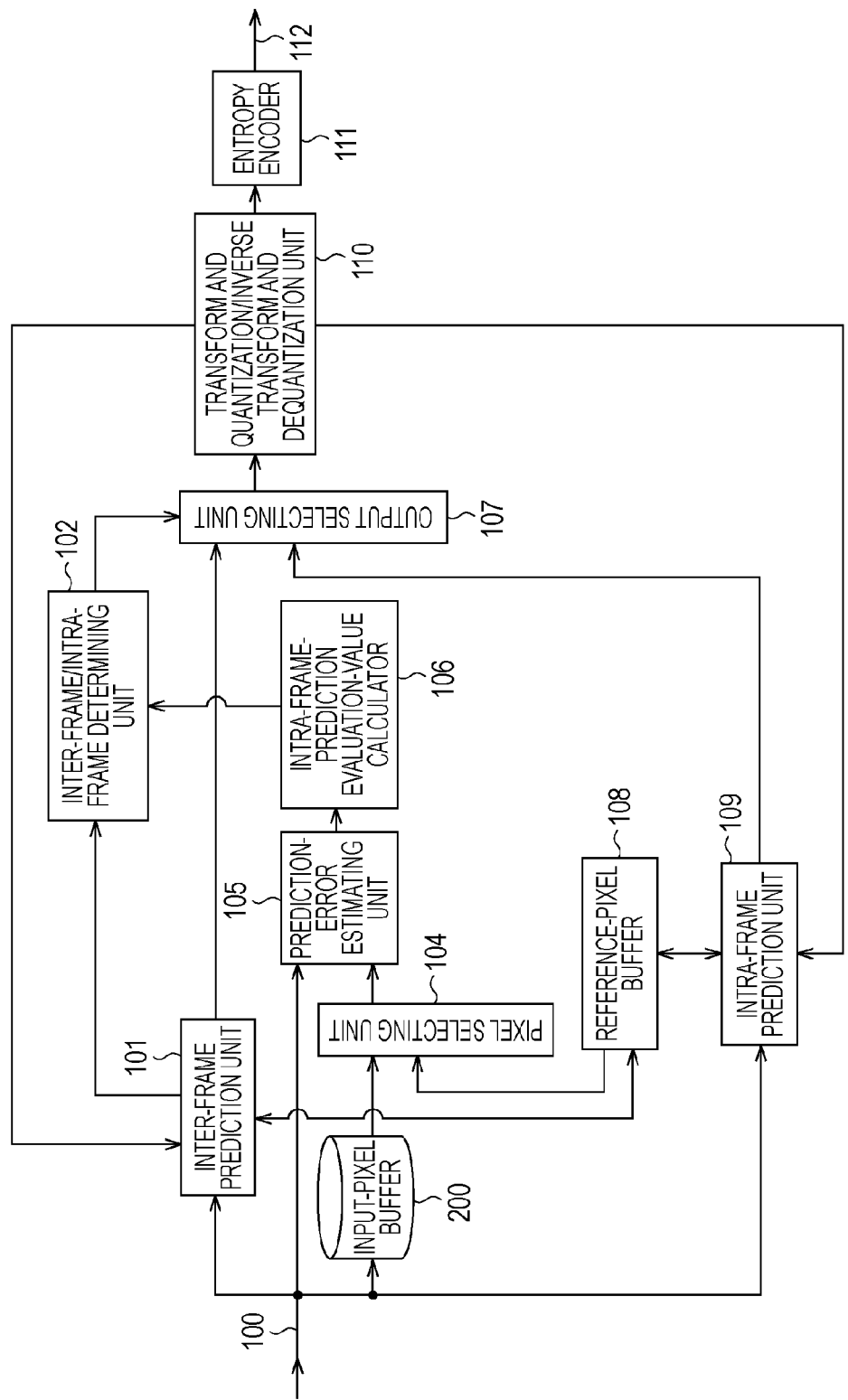
FIG. 2 is a block diagram showing an example of a functional configuration of an image encoding apparatus according to a second embodiment of the present invention.

Next, a second embodiment of the present invention will be described with reference to FIG. 2. FIG. 2 is a block diagram showing an example of a functional configuration of an image encoding apparatus according to the second embodiment. In FIG. 2, 100 to 112 denote items corresponding to those denoted by the same numerals in the first embodiment described with reference to FIG. 1. In FIG. 2, 200 denotes an input pixel buffer that stores data corresponding to one macro block of the input image 100 and that outputs the data to the pixel selecting unit 104 after a delay corresponding to one macro block.

In this embodiment, when reference pixels are temporally available, the pixel selecting unit 104 outputs the reference pixels stored in the reference-pixel buffer 108, and when reference pixels are not available, the pixel selecting unit 104 outputs the data stored in the input pixel buffer 200.

The input pixel buffer 200 supplies to the pixel selecting unit 104 data of a macro block immediately preceding a macro block currently being input to the prediction-error estimating unit 105. When it is determined that reference pixels are not available, the pixel selecting unit 104 operates so as to output delayed input pixels from the input pixel buffer 200 to the prediction-error estimating unit 105. Thus, instead of locally decoded pixels, the pixel selecting unit 104 outputs input pixels themselves as reference pixels. The delayed input pixels may be delayed input pixels at positions corresponding to the reference pixels, or pixels obtained through processing of the delayed input pixels.

As described above, regarding a portion for which reference pixels are not temporally available, input pixels themselves are used instead of reference pixels. Thus, in the case of an image that is relatively flat and that has a strong horizontal correlation, favorable compression can be achieved.

Third Embodiment

Figure 8:
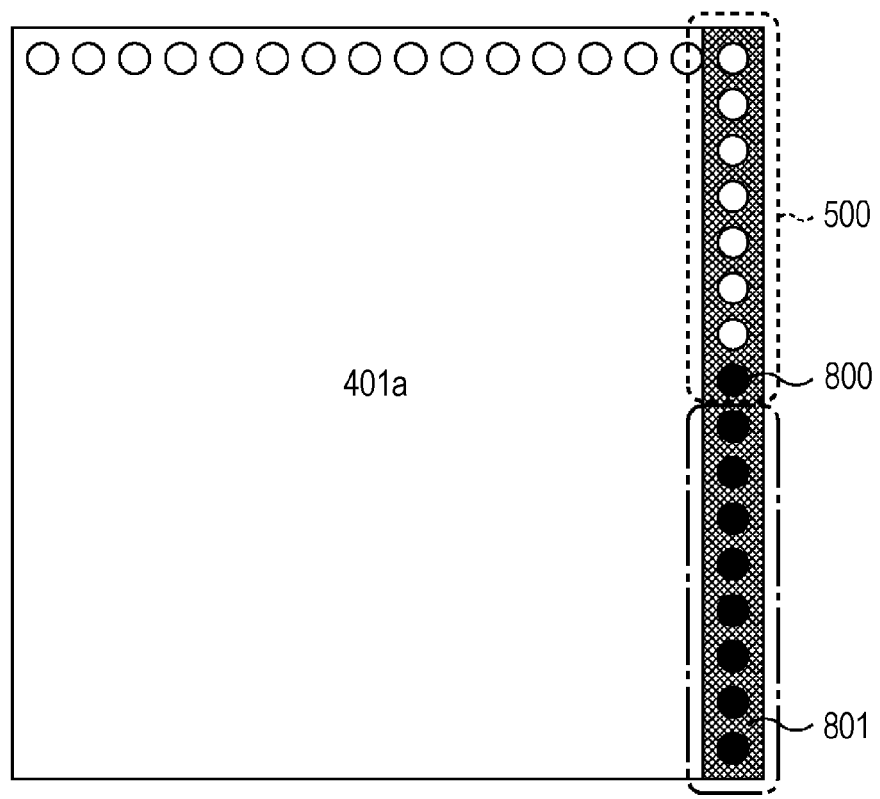
FIG. 8 is a diagram showing positional relationship of reference pixels for an input image and other pixels in a third embodiment of the present invention.

Next, a third embodiment of the present invention will be described with reference to FIG. 8. FIG. 8 is an enlarged view of the left reference macro block 401*a* in this embodiment. Since the image encoding apparatus according to the third embodiment is configured the same as the image encoding apparatus according to the first embodiment, further description thereof is omitted.

In FIG. 8, reference marks 401*a* and 500 denote items corresponding to those denoted by the reference marks in FIGS. 4 and 5. A latest reference pixel 800 for which encoding and local decoding have been finished is illustrated in black. Pixels indicated in black and enclosed by a broken line 801 are pixels for which encoding and local decoding have not been finished. In this embodiment, as opposed to the second embodiment, when reference pixels are not available, the pseudo-reference-pixel setting unit 113 sets the latest locally decoded reference pixel as pseudo reference pixels. That is, the value of the latest (last) pixel 800 for which encoding and local decoding have been finished is selected by the pixel selecting unit 104 as values of pseudo reference pixels.

As described above, according to this embodiment, values having a relatively close degree of distortion through encoding are used to calculate pseudo prediction errors. Thus, even in the case of a relatively high compression rate (where differences between input pixels and locally decoded pixels are large), the magnitude of distortion can be taken into consideration in executing operations.

Fourth Embodiment

Figure 9:
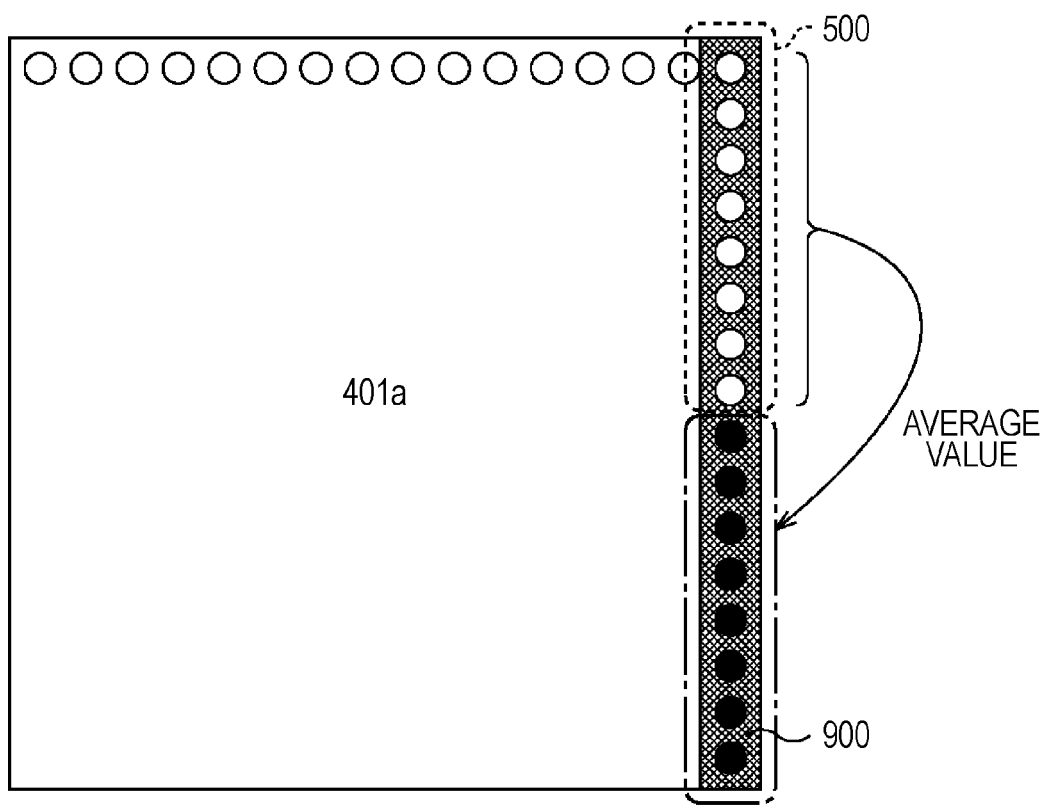
FIG. 9 is a diagram showing positional relationship of reference pixels for an input image and other pixels in a fourth embodiment of the present invention.

Next, a fourth embodiment of the present invention will be described with reference to FIG. 9. FIG. 9 is an enlarged view of the left reference macro block 401*a* in this embodiment. Since the image encoding apparatus according to the fourth embodiment is configured the same as the image encoding apparatus according to the first embodiment except as noted, redundant description thereof is omitted.

In FIG. 9, reference marks 401*a* and 500 denote items corresponding to those denoted by the same reference marks in FIGS. 4 and 5. Pixels 900, indicated in black, are pixels whose values have been replaced with an average value of reference pixels that have been encoded and locally decoded previously. In this embodiment, a mechanism for calculating an average value is provided in the pixel selecting unit 104. When reference pixels are not available, the pseudo-reference-pixel setting unit 113 sets an average value of the reference pixels 500 in the left reference macro block 401*a* as values of pseudo reference pixels. This incurs higher cost for processing compared with a case where input pixels are used. However, since locally decoded pixels are used, it becomes possible to calculate pseudo prediction errors in consideration of distortion that occurs through encoding.

Fifth Embodiment

Figure 3:
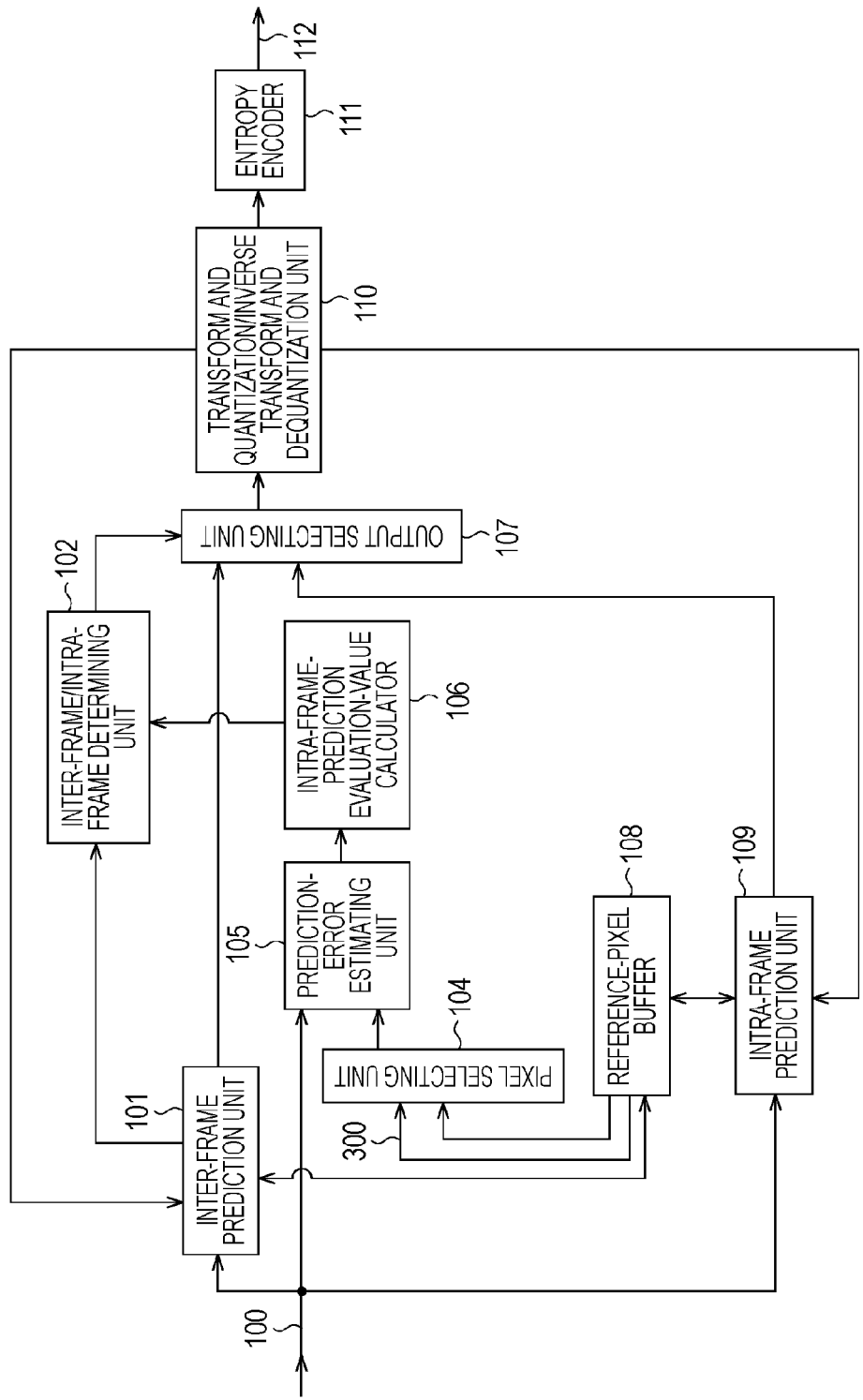
FIG. 3 is a block diagram showing an example of a functional configuration of an image encoding apparatus according to a fifth embodiment of the present invention.

Next, a fifth embodiment of the present invention is described with reference to FIGS. 3 and 7. FIG. 3 is a block diagram showing an example of a functional configuration of an image encoding apparatus according to the fifth embodiment. In FIG. 3, reference marks 100 to 112 denote items corresponding to those denoted by the same reference marks in the first embodiment described with reference to FIG. 1. A signal representing reference pixels 300 of a macro block further left to the left macro block used as reference pixels, which have been encoded and locally decoded, are also illustrated.

Figure 7:
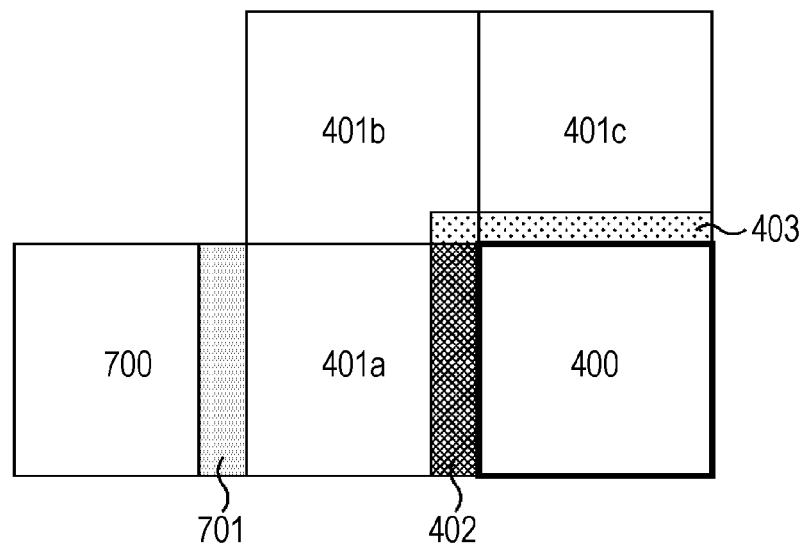
FIG. 7 is a diagram showing adjacent reference macro blocks, reference pixels, and a previous macro block and reference pixels in an input image.

FIG. 7 shows macro blocks and reference pixels in this embodiment. In FIG. 7, reference marks 400, 401a to 401c, 402, and 403 denote items corresponding to those denoted by the same reference marks in FIG. 4. A macro block 700 encoded immediately before the left reference macro block 401a and reference pixels 701 at the right end of the reference macro block 700 are also illustrated.

When reference pixels are not temporally available, pixels in the reference macro block 700 that exist on the corresponding vertical line as the unavailable reference pixels and for which encoding and local decoding have been finished are set as pseudo reference pixels. Thus, instead of reference pixels, the pixel selecting unit 104 selects pixels in the reference macro block 700 that exist on the corresponding vertical line as the unavailable reference pixels and for which encoding and local decoding have been finished. According to this embodiment, favorable compression can be achieved particularly in the case of an image that is relatively flat and that has strong horizontal correlation.

Sixth Embodiment

Figure 6:
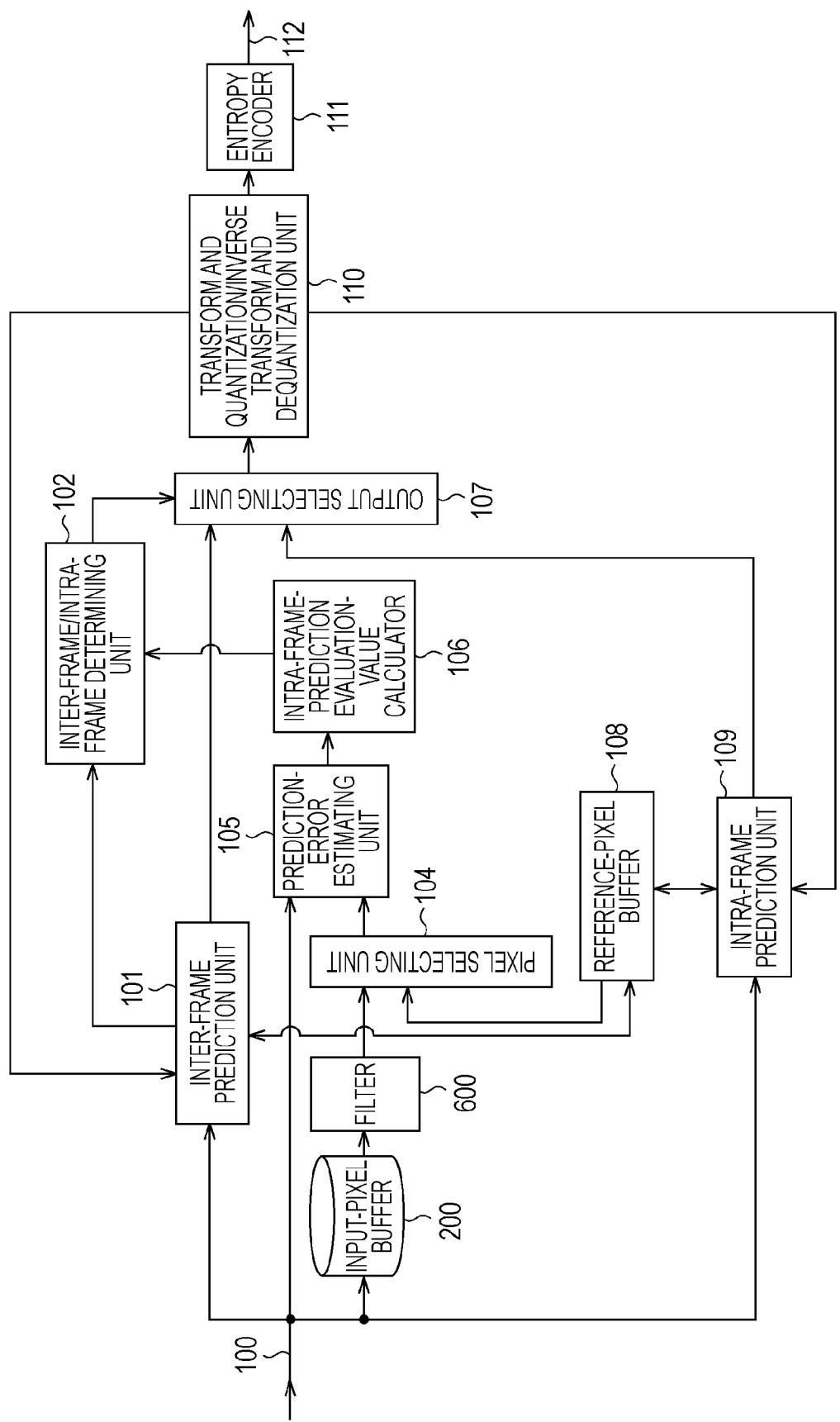
FIG. 6 is a block diagram showing an example of a functional configuration of an image encoding apparatus according to a sixth embodiment of the present invention.

Next, a sixth embodiment of the present invention is described with reference to FIG. 6. FIG. 6 is a block diagram showing an example of a functional configuration of an image encoding apparatus according to the sixth embodiment. In FIG. 6, reference marks 100 to 112 denote item corresponding to those denoted by the same reference marks in the second embodiment with reference to FIG. 2. A filter 600 that executes filtering on pixels output from the input pixel buffer 200 is also illustrated.

A main difference between input pixels and reference pixels is distortion that occurs through encoding. When input pixels are used instead of reference pixels, errors could occur depending on the compression rate. On the other hand, it is advantageous to use delayed input pixels because, for example, processing can be simplified. Thus, in this embodiment, the pseudo-reference-pixel setting unit 113 sets input pixels as pseudo reference pixels instead of reference pixels, and distortion is also taken into consideration.

More specifically, the filter 600 is provided at a subsequent stage of the input pixel buffer 200. Since high-frequency components of the input image 100 are removed at the time of encoding, by providing the filter 600 to achieve corresponding effects, it is possible to improve accuracy.

Furthermore, the characteristics (intensity) of the filter 600 can be changed in accordance with the compression rate. For example, when the compression rate is high, high-frequency components of locally decoded pixels tend to decrease, so that the cutoff frequency of the filter 600 is lowered or the attenuation rate is increased. Conversely, when the compression rate is low, the effect of the filter 600 is weakened (or alternatively signals are caused to pass through the filter 600 without any effect). This enables adaptive control. Regarding this embodiment, the type of filter is not particularly limited. For example, any type of low pass filter for such video data may be used.

As described above, in the image encoding apparatuses according to the first to sixth embodiments, when locally decoded reference pixels are temporally available for calculation of intra-frame pseudo prediction errors used to determine whether to use inter-frame prediction or intra-frame prediction, the locally decoded reference pixels are used. Accordingly, compared with the related art, it is possible to determine with improved accuracy whether to use inter-frame prediction or intra-frame prediction.

Furthermore, in any of the first to sixth embodiment described above, it may be allowed to adaptively change the criteria for determining whether to use inter-frame prediction or intra-frame prediction in accordance with the compression rate for predictive encoding. This allows more delicate control in accordance with the status of encoding. Furthermore, weights used for calculation executed by the prediction-error estimating unit 105 or the intra-frame-prediction evaluation-value calculator 106 may be changed in accordance with the ratio of reference pixels stored in the reference-pixel buffer 108 and input to the pixel selecting unit 104 and pseudo reference pixels. Furthermore, it is also possible to change weights by changing the criteria for determining whether to use inter-frame prediction or intra-frame prediction in accordance with the ratio of reference pixels stored in the reference-pixel buffer 108 and pseudo reference pixels.

Furthermore, the prediction-error estimating unit 105 in the first to sixth embodiments may be configured so that it is capable of executing processing in the four intra-frame prediction modes in units of 16×16 pixels according to the H.264 recommendation as tools of intra-frame encoding. This serves to improve accuracy even further.

Other Embodiments

In the embodiments described above, the functions of the pixel selecting unit 104, the prediction-error estimating unit 105, the intra-frame-prediction evaluation-value calculator 106, and the inter-frame/intra-frame determining unit 102 need not necessarily be implemented in hardware. For example, the functions may be achieved by a central processing unit (CPU) reading programs for implementing the functions from a memory and executing the programs. Such CPU may be incorporated for example as part of a general purpose computer, a special purpose computer, a video camera, or a video playback device such as a Digital Versatile Disc (DVD) recorder or other video recorder.

Furthermore, the configurations of image encoding apparatuses are not limited to those described above. The functions for the processing executed by the pixel selecting unit 104, the prediction-error estimating unit 105, the intra-frame-prediction evaluation-value calculator 106, and the inter-frame/intra-frame determining unit 102 may be implemented entirely or partially in special hardware. Furthermore, the memory from which the CPU reads the programs may be, for example, a non-volatile memory, such as a hard disk drive (HDD), a magneto-optical disk, a flash memory, or a read-only recording medium, such as a compact disc read-only memory (CD-ROM), a random access memory (RAM), a volatile memory other than RAM, or a computer-readable/writable recording medium implemented by a combination of these types of memory.

The term "computer-readable recording medium" herein may refer, for example, to a portable medium, such as a flexible disk, a magneto-optical disk, a ROM, or a CD-ROM, or a storage device included in a computer system, such as a hard disk. Furthermore, the term may refer to a volatile memory (RAM) in a computer system that acts as a server or a client in a case where the programs are transmitted via a network, such as the Internet, or a communication circuit, such as a telephone circuit. Furthermore, the term may refer to another memory (or memories) capable of storing a program for implementing the functions of the present invention.

Such programs may be transmitted from a computer system in which the programs are stored in a storage device or the like to another computer system in the form of waves transmitted through a transmission medium. The term "transmission medium" herein refers to a medium through which information can be transmitted, for example, a communication network, such as the Internet, or a communication circuit (communication line), such as a telephone circuit.

The programs may be programs for implementing part of the functions described above. The programs may also be difference files (difference programs) used to implement the functions in combination with programs already recorded in the computer system. Furthermore, the present invention can be embodied in the form of a program product, such as a computer-readable recording medium having recorded thereon one or more programs for implementing the functions of the present invention. The programs, recording medium, the transmission medium, and the program product fall within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-123806 filed May 8, 2007, which is hereby incorporated by reference herein in its entirety.

What is claimed is:

1. An image encoding apparatus comprising:
   an intra-frame prediction unit configured to execute intra-frame prediction regarding an input image, individually for blocks having an arbitrary size, thereby generating intra-frame prediction errors, and configured to locally decode the intra-frame prediction errors to generate intra-frame-prediction reference pixels;
   a pseudo-reference-pixel setting unit configured to set pseudo reference pixels from the input image;
   a pixel selecting unit configured to select, as reference pixels, the intra-frame-prediction reference pixels in a case where a local decoding process for generating the intra-frame-prediction reference pixels has already been finished, and to select, as reference pixels, the set pseudo reference pixels in a case where the local decoding process for generating the intra-frame-prediction reference pixels has not already been finished;
   an intra-frame-prediction evaluation-value calculating unit configured to calculate an intra-frame-prediction evaluation value using prediction errors between the reference pixels selected by the pixel selecting unit and the input image; and
   a determining unit configured to determine an encoding method, to be used for a block to be encoded, on the basis of the intra-frame-prediction evaluation value.

2. The image encoding apparatus according to claim 1, wherein the determining unit determines whether to use inter-frame prediction or intra-frame prediction as the encoding method.

3. The image encoding apparatus according to claim 1, wherein the determining unit changes a determining criterion in accordance with a compression rate of the input image.

4. An image encoding apparatus comprising:
   an intra-frame prediction unit configured to execute intra-frame prediction regarding an input image, individually for blocks having an arbitrary size, thereby generating intra-frame prediction errors, and configured to locally decode the intra-frame prediction errors to generate intra-frame-prediction reference pixels;
   a pseudo-reference-pixel setting unit configured to set, as pseudo reference pixels, reference pixels at positions closest to positions of needed pixels among intra-frame reference pixels that have been generated;
   a pixel selecting unit configured to select, as reference pixels, the intra-frame-prediction reference pixels in a case where a local decoding process for generating the intra-frame-prediction reference pixels has already been finished, and to select, as reference pixels, the set pseudo reference pixels in a case where the local decoding process for generating the intra-frame-prediction reference pixels has not already been finished;
   an intra-frame-prediction evaluation-value calculating unit configured to calculate an intra-frame-prediction evaluation value using prediction errors between the reference pixels selected by the pixel selecting unit and the input image; and
   a determining unit configured to determine an encoding method, to be used for a block to be encoded, on the basis of the intra-frame-prediction evaluation value.

5. The image encoding apparatus according to claim 4, wherein the determining unit determines whether to use inter-frame prediction or intra-frame prediction as the encoding method to be used for the block to be encoded.

6. The image encoding apparatus according to claim 4, wherein the determining unit changes a determining criterion in accordance with a compression rate of the input image.

7. An image encoding method comprising:
   executing intra-frame prediction regarding an input image, individually for blocks having an arbitrary size, thereby generating intra-frame prediction errors, and locally decoding the intra-frame prediction errors to generate intra-frame-prediction reference pixels;
   setting pseudo reference pixels from the input image;
   selecting, as reference pixels, the intra-frame-prediction reference pixels in a case where a local decoding process for generating the intra-frame-prediction reference pixels has already been finished, and to select, as reference pixels, the set pseudo reference pixels in a case where the local decoding process for generating the intra-frame-prediction reference pixels has not already been finished;
   calculating an intra-frame-prediction evaluation value using prediction errors between the reference pixels selected in the reference pixels selecting step and the input image; and
   determining an encoding method, to be used for a block to be encoded, on the basis of the intra-frame-prediction evaluation value.

8. A non-transitory machine-readable recording medium storing a program executable by a machine to cause the machine to function as the image encoding apparatus according to claim 1.

9. The non-transitory machine-readable recording medium of claim 8, wherein the machine is a computer.

10. The non-transitory machine-readable recording medium of claim 8, wherein the machine is a video camera.

11. The non-transitory machine-readable recording medium of claim 8, wherein the machine is a video recorder.

* * * * *